US009755431B2

(12) United States Patent
Sasaki et al.

(10) Patent No.: US 9,755,431 B2
(45) Date of Patent: Sep. 5, 2017

(54) POWER MANAGEMENT SYSTEM AND POWER MANAGEMENT METHOD

(75) Inventors: Yasushi Sasaki, Yokohama (JP); Nobuo Kuchiki, Yokohama (JP); Takashi Baba, Kawasaki (JP); Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 849 days.

(21) Appl. No.: 14/006,947

(22) PCT Filed: Mar. 23, 2012

(86) PCT No.: PCT/JP2012/057642
§ 371 (c)(1),
(2), (4) Date: Sep. 23, 2013

(87) PCT Pub. No.: WO2012/133249
PCT Pub. Date: Oct. 4, 2012

(65) Prior Publication Data
US 2014/0008978 A1     Jan. 9, 2014

(30) Foreign Application Priority Data
Mar. 25, 2011   (JP) ................................. 2011-067987

(51) Int. Cl.
*H02J 1/00*       (2006.01)
*H02J 3/38*       (2006.01)
(Continued)

(52) U.S. Cl.
CPC ............... *H02J 1/00* (2013.01); *H02J 3/383* (2013.01); *H02J 13/0006* (2013.01);
(Continued)

(58) Field of Classification Search
None
See application file for complete search history.

(56) References Cited

FOREIGN PATENT DOCUMENTS

JP      2003-346271 A      12/2003
JP       2003346271 A  *   12/2003
(Continued)

OTHER PUBLICATIONS

International Search Report; PCT/JP2012/057642; Jun. 19, 2012.

*Primary Examiner* — Rexford Barnie
*Assistant Examiner* — Swarna N Chowdhuri
(74) *Attorney, Agent, or Firm* — Procopio Cory Hargreaves and Savitch LLP

(57) ABSTRACT

A power management system has power supplying means, measuring means that measures power generation environment for the power supplying means, and communication means that transmits information measured by the measuring means. The power management system comprises: a control unit that controls the measuring means and the communication means. The power supplying means is used as a power source for the measuring means and the communication means. The control unit sets a first power threshold to be used for determining whether or not to switch operation states of the measuring means and a second power threshold to be used for determining whether or not to switch operation states of the communication means on the basis of a power supply that is supplied from the power supplying means.

19 Claims, 7 Drawing Sheets

(51) Int. Cl.
*H02J 13/00* (2006.01)
*H04Q 9/00* (2006.01)

(52) U.S. Cl.
CPC ...... *H02J 13/0024* (2013.01); *H02J 13/0079* (2013.01); *H04Q 9/00* (2013.01); *H04Q 2209/823* (2013.01); *H04Q 2209/886* (2013.01); *Y02E 10/563* (2013.01); *Y02E 40/72* (2013.01); *Y04S 10/123* (2013.01); *Y10T 307/344* (2015.04); *Y10T 307/832* (2015.04)

(56) References Cited

FOREIGN PATENT DOCUMENTS

| | | | |
|---|---|---|---|
| JP | 2004-221479 A | | 8/2004 |
| JP | 2004221479 A | * | 8/2004 |
| JP | 2004-295688 A | | 10/2004 |
| JP | 2010-239517 A | | 10/2010 |
| JP | 2010239517 A | * | 10/2010 |

* cited by examiner

POWER MANAGEMENT SYSTEM AND POWER MANAGEMENT METHOD

TECHNICAL FIELD

The present invention relates to a power management system provided with power supplying means represented by photovoltaic cells, measuring means that measures a power generation environment for the power supplying means, and communication means that transmits information measured by the measuring means, and relates also to a power management method.

BACKGROUND ART

A conventionally known technology is to change operation power points of photovoltaic cells so as to maximize an amount of power generated by photovoltaic cells. Such a technique is called MPPT (Maximum Power Point Tracking) method (for example, PTL 1).

Also known is a system (hereinafter referred to as EMS: Energy Management System) for controlling an interconnection between photovoltaic cells and a power system. The EMS controls such that power generated by photovoltaic cells is output to the power system side (reverse power flow control), and so forth.

Since the amount of power generated by the photovoltaic cell is affected by weather, information measured by measuring means is used so as to predict the amount of power generated by the photovoltaic cell. It is noted that examples of the measuring means include an actinometer for measuring the amount of solar radiation, a thermometer for measuring air temperature, and a thermocouple for measuring a temperature of photovoltaic cells. As it is preferable to arrange the measuring means close to the photovoltaic cell in these cases, communication means is used so as to transmit the information measured by the measuring means to the EMS.

There are some cases, though, where it is not possible to obtain a power source without any inhibition at an installation site for power supplying means represented by photovoltaic cells. For example, the photovoltaic cell may be installed in a desert.

The inventors, in such cases, conceived of using the power supplying means represented by photovoltaic cells, as a power source for the measuring means and the communication means.

On the other hand, as mentioned above, the amount of power generated by an off-grid power supplying means such as photovoltaic cells is affected by weather. Accordingly, when the power supplying means represented by photovoltaic cells is used as a power source for the measuring means and the communication means, it is impossible to stably supply power to the measuring means and the communication means.

CITATION LIST

Patent Literature

PTL 1: Japanese Patent Application Publication No. 2004-295688

SUMMARY OF THE INVENTION

A power management system (power management system 100) according to the first feature has power supplying means (e.g., photovoltaic cell 10), measuring means (measuring means 20) that measures power generation environment for the power supplying means, and communication means (communication means 43) that transmits information measured by the measuring means. The power management system comprises: a control unit (control unit 42) that controls the measuring means and the communication means. The power supplying means is used as a power source for the measuring means and the communication means. The control unit sets a first power threshold to be used for determining whether or not to switch operation states of the measuring means and a second power threshold to be used for determining whether or not to switch operation states of the communication means on the basis of a power supply that is supplied from the power supplying means. The control unit switches operation states of the measuring means on the basis of results comparing the power supply with the first power threshold, and switches operation states of the communication means on the basis of results comparing the power supply with the second power threshold.

In the first feature, a photovoltaic cell is provided as the power supplying means.

In the first feature, the second power threshold is greater than the first power threshold.

In the first feature, the first power threshold is a first operation starting power threshold to be used for determining whether or not to start operating the measuring means and a first operation stopping power threshold to be used for determining whether or not to stop operating the measuring means. The second power threshold is a second operation starting power threshold to be used for determining whether or not to start operating the communication means and a second operation stopping power threshold to be used for determining whether or not to stop operating the communication means. The control unit sets, as the first operation starting power threshold, a threshold smaller than the second operation starting power threshold, and sets, as the first operation stopping power threshold, a threshold smaller than the second operation stopping power threshold. The control unit switches operation states of the measuring means on the basis of results comparing the power supply with the first power threshold, and switches operation states of the communication means on the basis of results comparing the power supply with the second power threshold.

In the first feature, the control unit uses a real-time amount of power generated by the power supplying means, as the power supply.

In the first feature, the power management system further comprises: a storage battery that stores power generated by the power supplying means. The control unit uses an amount of power stored in the storage battery as the power supply.

In the first feature, the power management system further comprises: a storage battery that stores power generated by the power supplying means. The control unit uses a real-time amount of power generated by the power supplying means and the amount of power stored in the storage battery, as the power supply.

In the first feature, the first power threshold is a first extended power threshold to be used for determining whether or not to extend a measurement cycle of the measuring means and a first shortened power threshold to be used for determining whether or not to shorten a measurement cycle of the measuring means. The second power threshold is a second extended power threshold to be used for determining whether or not to extend a transmission cycle of the communication means and a second shortened power threshold to be used for determining whether or not to shorten the transmission cycle of the communication means. The control unit sets, as the first extended power threshold, a threshold smaller than the second extended power threshold, and sets, as the first shortened power threshold, a threshold smaller than the second shortened power threshold.

In the first feature, the control unit supplies electric current that is smaller than a predetermined threshold, to the measuring means during a period when the measuring means does not operate.

In the first feature, the power management system further comprises: an auxiliary photovoltaic cell available as a power source for the measuring means and the communication means. The control unit uses a power supply that is supplied from the auxiliary photovoltaic cell as the power supply.

A power management system according to the second feature has power supplying means, measuring means that measures power generation environment for the power supplying means, and communication means that transmits information measured by the measuring means. The power management system comprises: a control unit that controls the measuring means and the communication means. The control unit controls the communication means so as to transmit information that indicates a switch of operation states of the measuring means, and information that indicates a switch of operation states of the communication means.

A power management method according to the third feature is a method used in the power management system that has power supplying means, measuring means that measures power generation environment for the power supplying means, and communication means that transmits information measured by the measuring means. The power supplying means is used as a power source for the measuring means and the communication means. The power management method comprises steps of: setting a first power threshold to be used for determining whether or not to switch operation states of the measuring means and a second power threshold to be used for determining whether or not to switch operation states of the communication means on the basis of a power supply that is supplied from the power supplying means, and switching operation states of the measuring means on the basis of results comparing the power supply with the first power threshold, and switching operation states of the communication means on the basis of results comparing the power supply with the second power threshold.

In the third feature, a photovoltaic cell is provided as the power supplying means.

In the third feature, the second power threshold is greater than the first power threshold.

In the third feature, the first power threshold is a first operation starting power threshold to be used for determining whether or not to start operating the measuring means and a first operation stopping power threshold to be used for determining whether or not to stop operating the measuring means. The second power threshold is a second operation starting power threshold to be used for determining whether or not to start operating the communication means and a second operation stopping power threshold to be used for determining whether or not to stop operating the communication means. The power management method comprises steps of: setting, as the first operation starting power threshold, a threshold smaller than the second operation starting power threshold, and setting, as the first operation stopping power threshold, a threshold smaller than the second operation stopping power threshold.

In the third feature, the power management method comprises a step of: using a real-time amount of power generated by the power supplying means and the amount of power stored in the storage battery, as the power supply.

In the third feature, the storage battery that stores power generated by the power supplying means is provided. The power management method comprises a step of: using the amount of power stored in the storage battery, as the power supply.

In the third feature, a storage battery that stores power generated by the power supplying means is provided. The power management method comprises a step of: using a real-time amount of power generated by the power supplying means and the amount of power stored in the storage battery, as the power supply.

In the third feature, the first power threshold is a first extended power threshold to be used for determining whether or not to extend a measurement cycle of the measuring means and a first shortened power threshold to be used for determining whether or not to shorten a measurement cycle of the measuring means. The second power threshold is a second extended power threshold to be used for determining whether or not to extend a transmission cycle of the communication means and a second shortened power threshold to be used for determining whether or not to shorten the transmission cycle of the communication means. The power management method comprises steps of: setting, as the first extended power threshold, a threshold smaller than the second extended power threshold, and setting, as the first shortened power threshold, a threshold smaller than the second shortened power threshold.

DESCRIPTION OF THE EMBODIMENT

Figure 1:
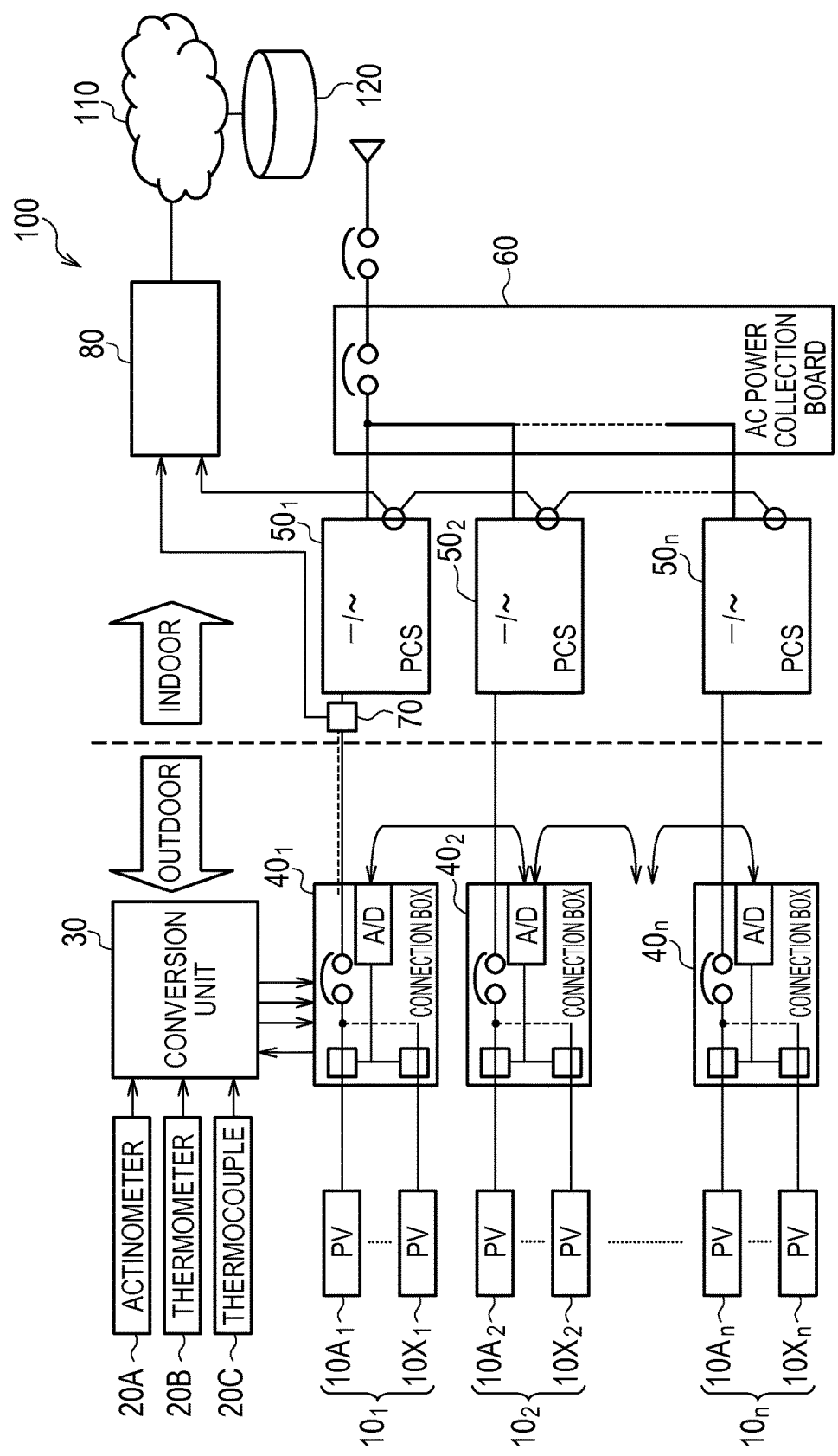
FIG. 1 is a diagram indicating a power management system 100 according to the first embodiment.

Hereinafter, the power management system according to the embodiment of the present invention will be described with reference to the drawings. Note that in the drawings below, the same or similar reference signs are applied to the same or similar parts.

It will be appreciated that the drawings are schematically shown and the ratio and the like of each dimension are different from the real ones. Therefore, a specific dimension should be determined in view of the following description. Moreover, among the drawings, the respective dimensional relations or ratios may differ.

SUMMARY OF THE EMBODIMENT

The power management system according to the embodiment has power supplying means, measuring means that measures power generation environment for the power supplying means, and communication means that transmits information measured by the measuring means. The power management system comprises: a control unit that controls the measuring means and the communication means. The power supplying means is used as a power source for the measuring means and the communication means. The control unit sets a first power threshold to be used for determining whether or not to switch operation states of the measuring means and a second power threshold to be used for determining whether or not to switch operation states of the communication means on the basis of a power supply that is supplied from the power supplying means. The control unit switches operation states of the measuring means on the basis of results comparing the power supply with the first power threshold, and switches operation states of the communication means on the basis of results comparing the power supply with the second power threshold.

In the embodiments, the control unit sets a first power threshold and a second power threshold on the basis of a power supply that is supplied from the power supplying means. In other words, the operation state of the measuring means switches according to results comparing the power supply with the first power threshold. Also, the operation state of the communication means switches according to results comparing the power supply with the second power threshold.

Therefore, when the photovoltaic cell is used as a power source for the measuring means and the communication means, it is possible to appropriately control the operation of the measuring means and the communication means.

Additionally, the power supplying means of the present invention is means that generates power by itself, including a photovoltaic cell, a wind power station, and a hydraulic power unit. In the embodiments, a photovoltaic cell is exemplified as the power supplying means.

First Embodiment (Configuration of Power Management System)

A power management system according to a first embodiment will be explained below with reference to drawings. FIG. 1 shows a power management system 100 according to the first embodiment.

As shown in FIG. 1, the power management system 100 has a plurality of photovoltaic cells 10, measuring means 20, a conversion unit 30, a plurality of connection boxes 40, a plurality of PCSs 50, an AC power collection board 60, a separation device 70, a measurement processor 80, a communication network 110, and a server 120.

The plurality of photovoltaic cells 10 (PVs in FIG. 1) include photovoltaic cell cluster 10₁ that belongs to a first group (photovoltaic cell $10A_1$ to photovoltaic cell $10X_1$), photovoltaic cell cluster 10₂ that belongs to a second group (photovoltaic cell $10A_2$ to photovoltaic cell $10X_2$), . . . , and photovoltaic cell cluster $10_n$ that belongs to an nth group (photovoltaic cell $10A_n$ to photovoltaic cell $10X_n$).

Also, the photovoltaic cells 10 are an example of power supplying means that supplies power. Specifically, the photovoltaic cells 10 generate power in response to light such as sunlight.

The measuring means 20 is measuring instruments including a sensing device, a measuring block, and a measuring device. In the first embodiment, the measuring means 20 is, for example, a sensor for measuring the power generation environment for the photovoltaic cells 10. The measuring means 20 is provided close to the photovoltaic cells 10, and includes, for example, an actinometer 20A, a thermometer 20B, and a thermocouple 20C. The actinometer 20A measures the amount of solar radiation irradiated onto the photovoltaic cells 10. The thermometer 20B measures air temperature around the photovoltaic cells 10. The thermocouple 20C measures the temperature of the photovoltaic cells 10.

The measuring means 20 may be any one of the actinometer 20A, the thermometer 20B, and the thermocouple 20C. Alternatively, the measuring means 20 may be a measuring instrument other than the actinometer 20A, the thermometer 20B, and the thermocouple 20C.

As a power source for the measuring means 20, the photovoltaic cells 10 are used. In the case illustrated in FIG. 1, the photovoltaic cell cluster 10₁ is used as a power source for the measuring means 20.

The conversion unit 30 converts information measured by the measuring means 20. Specifically, the conversion unit 30 samples analog signals output from the measuring means 20, and converts the analog signals to digital signals.

In the first embodiment, the conversion unit 30 is connected to a connection box 40₁, and the information measured by the measuring means 20 is output to the connection box 40₁.

The plurality of connection boxes 40 respectively correspond to the groups of the photovoltaic cells 10. Specifically, the plurality of connection boxes 40 include a connection box 40₁ corresponding to the photovoltaic cell cluster 10₁, a connection box 40₂ corresponding to the photovoltaic cell cluster 10₂, . . . , and a connection box $40_n$ corresponding to the photovoltaic cell cluster $10_n$.

A circuit cluster accommodated in each connection box 40 concentrates power lines extending from the plurality of photovoltaic cells 10 connected to the connection box 40. Moreover, the circuit cluster accommodated in each connection box 40 individually detects outputs (output voltage and output electric current) of the plurality of photovoltaic cells 10 connected to the connection boxes 40.

The plurality of connection boxes 40 are connected to each other via wireless or wired connection. The outputs (output voltage and output electric current) of the photovoltaic cells 10 detected by a circuit cluster accommodated in each connection box 40 are exchanged by one another among the circuit clusters accommodated in the plurality of connection boxes 40.

In the first embodiment, a circuit cluster accommodated in the connection box 40₁ is, as described above, connected to the conversion unit 30, and acquires the information measured by the measuring means 20 from the conversion unit 30. Moreover, the circuit cluster accommodated in the connection box 40₁ is connected to the measurement processor 80 via wireless or wired connection, and transmits the information measured by the measuring means 20 to the measurement processor 80. In the first embodiment, communication between the connection box 40₁ and the measurement processor 80 is carried out by PLC (Power Line Communications) using power lines.

The circuit clusters accommodated in the connection boxes 40 will be described in detail below (see FIG. 2).

It should be noted herein that the photovoltaic cells 10, the measuring means 20, the conversion unit 30, and the connection boxes 40 are placed, for example, outdoors.

The plurality of PCSs 50 respectively correspond to the plurality of connection boxes 40. Specifically, the plurality of PCSs 50 have a PCS $50_1$ corresponding to the connection box $40_1$, a PCS $50_2$ corresponding to the connection box $40_2$, ..., and a PCS $50_n$ corresponding to the connection box $40_n$.

Each of the PCS 50 is a device (Power Conditioning System) for converting DC power to AC power. Specifically, the PCS 50 converts DC power supplied from the photovoltaic cells 10 to AC power, and then supplies the AC power to a power system side.

Additionally, the PCSs 50 may have a function for converting AC power to DC power. For example, the PCSs 50 may convert the AC power supplied from the power system side to a direct electric current and supply the DC power to a storage battery (not shown).

The AC power collection board 60 concentrates power lines extending from the plurality of PCSs 50. The AC power collection board 60 supplies AC power converted by the plurality of PCSs 50, to a power system side.

The separation device 70 separates signals superimposed on electric current flowing through power lines. The separation device 70 is connected to the measurement processor 80 via wireless or wired connection. The separation device 70 transmits signals separated from the electric current flowing through power lines to the measurement processor 80.

In the first embodiment, the separation device 70 is connected to the connection box $40_1$ and the PCS $50_1$ through power lines. The separation device 70 separates signals (that is, information measured by the measuring means 20) superimposed on the electric current by the connection box $40_1$.

The measurement processor 80 is a device for receiving signals from the separation device 70 and signals from the PCSs 50, and transmitting information measured by the measuring means 20 to the server 120 through, for example, the communication network 110. Moreover, the measurement processor 80 may include the plurality of PCSs 50. Alternatively, the measurement processor 80 may include the plurality of PCSs 50 and the AC power collection board 60. Additionally, the measurement processor 80 may be a device (the Energy Management System) for controlling an interconnection between the plurality of photovoltaic cells 10 and the power system, and may be connected to indoor load for controlling connected load. It should be noted here that the PCSs 50, the AC power collection board 60, the separation device 70, and the measurement processor 80 are placed, for example, indoors.

The communication network 110 is a network such as the Internet. The server 120 has a function for predicting an amount of power generated by photovoltaic cells provided at each facility, for example. Alternatively, the server 120 controls a power amount (reverse power flow) output from photovoltaic cells provided at each facility.

(Configuration of Connection Box)

Hereinafter, the connection box according to the first embodiment is explained with reference to the drawings. FIG. 2 is a diagram indicating a circuit cluster accommodated in the connection box 40 according to the first embodiment. It should be noted that the connection box 40 (connection box $40_1$ in the first embodiment) that accommodates a circuit cluster for communicating with the measurement processor 80 is explained herein.

Figure 2:
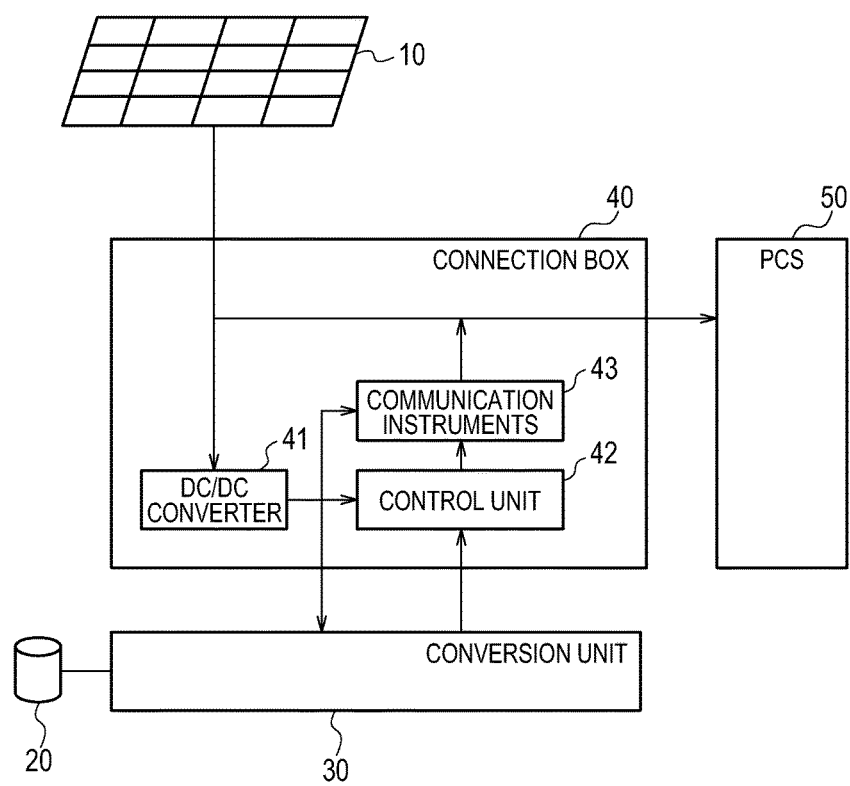
FIG. 2 is a diagram indicating a connection box 40 according to the first embodiment.

As illustrated in FIG. 2, the connection box 40 has a DC/DC converter 41, a control unit 42, and communication means 43. It should be noted that, as illustrated in FIG. 2, power supplied from the photovoltaic cell 10 is supplied to the DC-DC converter 41 and the PCS 50.

The DC-DC converter 41 is a circuit to transform the power supplied from the photovoltaic cell 10. The power transformed by the DC-DC converter 41, is supplied to the measuring means 20 (including the conversion unit 30, hereinafter), the control unit 42, and the communication means 43.

The control unit 42 controls the measuring means 20 and the communication means 43. Specifically, the control unit 42 controls an operation state of the measuring means 20 as well as an operation state of the communication means 43 on the basis of a power supply that is supplied from the photovoltaic cell 10.

Firstly, the control unit 42 detects the power supply from the photovoltaic cell 10. In the first embodiment, the control unit 42 detects, as the power supply, a real-time amount of power generated by the photovoltaic cell 10.

Secondly, the control unit 42 sets a first power threshold to be used for determining whether or not to switch the operation state of the measuring means 20 and a second power threshold to be used for determining whether or not to switch the operation state of the communication means 43.

For example, the operation states of the measuring means 20 are, for example, assumed to include a state (OFF state) where the measuring means 20 stops operating and a state (ON state) where the measuring means 20 is operating. In other words, the first power threshold may be a first operation starting power threshold to be used for determining whether or not the measuring means 20 starts its operation and may also be a first operation stopping power threshold to be used for determining whether or not the measuring means 20 stops operating. Also, the first operation starting power threshold and the first operation stopping power threshold may be different from each other.

Alternatively, the operation states of the measuring means 20 are, for example, are assumed to include a state (extended state) where the measurement cycle of the measuring means 20 is long and a state (shortened state) where the measurement cycle of the measuring means 20 is long. In other words, the first power threshold may be a first extended power threshold to be used for determining whether or not the measurement cycle of the measuring means 20 is extended, and may also be a first shortened power threshold to be used for determining whether or not the measurement cycle of the measuring means 20 is shortened. In addition, the first extended power threshold and the first shortened power threshold may be different from each other.

For example, the operation states of the communication means 43 are, for example, assumed to include a state (OFF state) where the communication means 43 stops operating and a state (ON state) where the communication means 43 is operating. In other words, the second power threshold may be a second operation starting power threshold to be used for determining whether or not the communication means 43 starts operating and may be a second operation stopping power threshold to be used for determining whether or not the communication means 43 stops operating. Also, the second operation starting power threshold and the second operation stopping power threshold may be different from each other.

Alternatively, the operation states of the communication means 43 are, for example, assumed to include a state (extended state) where the transmission cycle of the communication means 43 is long and a state (shortened state) where the transmission cycle of the communication means 43 is short. In other words, the second power threshold may be a second extended power threshold to be used for determining whether or not the transmission cycle of the communication means 43 is extended, and may be a second shortened power threshold to be used for determining whether or not the transmission cycle of the communication means 43 is shortened. In addition, the second extended power threshold and the second shortened power threshold may be different from each other.

Generally, the power consumption of the communication means 43 is larger than the power consumption of the measuring means 20 herein.

Accordingly, the control unit 42 preferably sets, as the first operation starting power threshold, a threshold smaller than the second operation starting power threshold, and sets, as the first operation stopping power threshold, a threshold smaller than the second operation stopping power threshold. Alternatively, the control unit 42 preferably sets, as the first extended power threshold, a threshold smaller than the second extended power threshold, and sets, as the first shortened power threshold, a threshold smaller than the second shortened power threshold.

Thirdly, the control unit 42 switches the operation state of the measuring means 20 on the basis of results comparing the power supply (real-time amount of power generated in the first embodiment) with the first power threshold.

For example, the control unit 42 switches the operation state of the measuring means 20 to the ON state when the power supply exceeds the first operation starting power threshold. Alternatively, the control unit 42 switches the operation state of the measuring means 20 to the OFF state when the power supply falls below the first operation stopping power threshold. Alternatively, the control unit 42 switches the operation state of the measuring means 20 to the shortened state when the power supply exceeds the first shortened power threshold. Alternatively, the control unit 42 switches the operation state of the measuring means 20 to the extended state when the power supply falls below the first extended power threshold.

Additionally, the control unit 42 switches the operation state of the communication means 43 to the ON state when the power supply exceeds the second operation starting power threshold. Alternatively, the control unit 42 switches the operation state of the communication means 43 to the OFF state when the power supply falls below the second operation stopping power threshold. Alternatively, the control unit 42 switches the operation state of the communication means 43 to the shortened state when the power supply exceeds the second shortened power threshold. Alternatively, the control unit 42 switches the operation state of the communication means 43 to the extended state when the power supply falls below the second extended power threshold.

The communication means 43 is various types of communication instrument including a communication device, a communication block, a communication instrument, etc. Specifically, the communication means 43 transmits information measured by the measuring means 20 to the measurement processor 80. As described above, the communication means 43 is a PLC adapter, etc. when communication between the connection box 40₁ and the measurement processor 80 is carried out by PLC.

(Example of Controlling Measuring Means)

Figure 3:
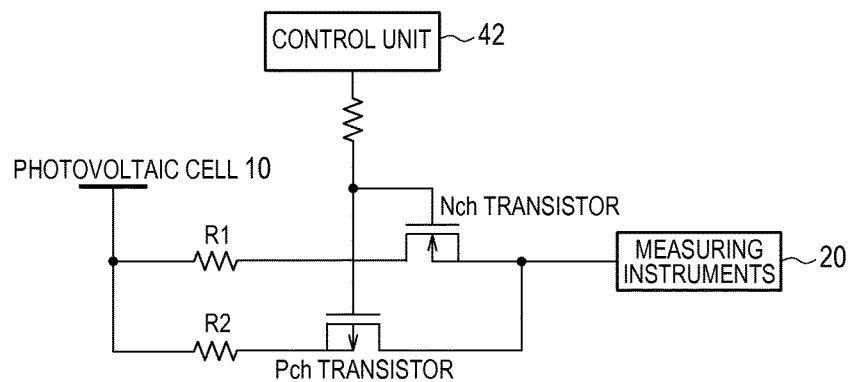
FIG. 3 is a diagram indicating a circuit for controlling the measuring means 20 according to the first embodiment.

Hereinafter, an example of controlling the measuring means according to the first embodiment is explained. FIG. 3 is a diagram indicating a circuit for controlling the measuring means 20 according to the first embodiment. Additionally, although "photovoltaic cell 10" is indicated in this figure, the "photovoltaic cell 10" includes a power source unit that functions as a circuit to supply stable voltage.

As illustrated in FIG. 3, the control unit 42 is connected to both of the gate of an Nch transistor and the gate of a Pch transistor, and controls the gate voltage of the Nch transistor and the gate voltage of the Pch transistor simultaneously. The resistance values of resistance R1 and resistance R2 are different from each other (for example, R2≥R1).

In such a case, when the gate voltage of the Nch transistor and the gate voltage of the Pch transistor are larger than a threshold, the Nch transistor is ON and the Pch transistor is OFF. Accordingly, an electric current flowing via the resistance R1 is supplied to the measuring means 20. That is, since the resistance value of the resistance R1 is small, a high electric current is supplied to the measuring means 20.

On the other hand, when the gate voltage of the Nch transistor and the gate voltage of the Pch transistor are smaller than a threshold, the Nch transistor is OFF and the Pch transistor is ON. Accordingly, an electric current flowing via the resistance R2 is supplied to the measuring means 20. That is, the resistance value of the resistance R2 is large, and thus, a low electric current is supplied to the measuring means 20.

Thus, it is possible to control the measuring means 20 by providing the resistance R1 and the resistance R2 having appropriate resistance values.

Specifically, the operation states of the measuring means 20 are assumed to include the ON state, OFF, extended state, shortened state, etc. as described above. In any operation state, there is a period when the measuring means 20 is not operating.

Thus, even in a period when the measuring means 20 is not operating, the control unit 42 supplies the measuring means 20 with electric current (minute electric current) that is smaller than a predetermined threshold, by controlling the gate voltage of the Nch transistor and the gate voltage of the Pch transistor. Thereby, the measuring means 20 is prevented from breakdown.

(Example of Controlling Operation States)

Figure 4:
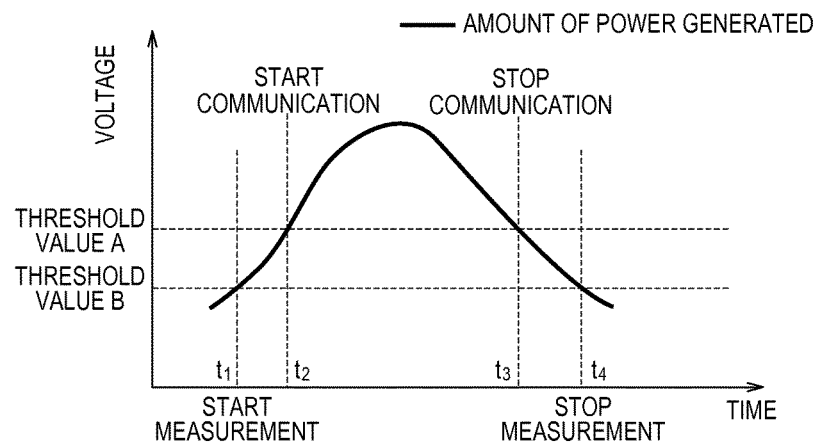
FIG. 4 is a diagram indicating an example of controlling the operation states according to the first embodiment.

Hereinafter, an example of controlling the operation states according to the first embodiment is explained. FIG. 4 is a diagram indicating an example of controlling the operation states according to the first embodiment.

In this case, the operation states of the measuring means 20*i* include the ON state and the OFF state. Additionally, as the operation states of the communication means 43, there indicated are the cases with the presence of the ON state and the OFF state. Additionally, a threshold A is the second operation starting power threshold and the second operation stopping power threshold, and a threshold B is the first operation starting power threshold and the first operation stopping power threshold.

In a case illustrated in FIG. 4, as for the power supply, a real-time amount of power generated by the photovoltaic cell 10 is used.

As illustrated in FIG. 4, as an amount of power generated exceeds the threshold B at time $t_1$, the control unit 42 starts operating the measuring means 20. Since an amount of power generated exceeds the threshold A at time $t_2$, the control unit 42 starts operating the communication means

43. Since an amount of power generated falls below the threshold A at time $t_3$, the control unit 42 stops operating the communication means 43. As an amount of power generated falls below the threshold B at time $t_4$, the control unit 42 stops operating the measuring means 20.

(Operation and Effect)

In the first embodiment, the control unit 42 sets the first power threshold and the second power threshold on the basis of the power supply (amount of power generated) from the photovoltaic cell 10. In other words, the operation states of the measuring means 20 switch according to the results comparing the power supply (amount of power generated) with the first power threshold. Additionally, the operation states of the communication means 43 switch according to the results comparing the power supply (amount of power generated) and the second power threshold.

Accordingly, when the photovoltaic cell 10 is used as a power source for the measuring means 20 or the communication means 43, the operations of the measuring means 20 or the communication means 43 can be controlled appropriately.

More particularly, when the power supply (amount of power generated) is small, the control of stopping the operation of the measuring means 20 becomes possible, and the control of stopping the operation of the communication means 43 becomes possible. Similarly, when the power supply (amount of power generated) is small, the control of extending the measurement cycle of the measuring means 20 becomes possible, and the control of extending the transmission cycle of the communication means 43 becomes possible.

In the first embodiment, the control unit 42 sets, as the first operation starting power threshold, a threshold smaller than the second operation starting power threshold, and sets, as the first operation stopping power threshold, a threshold smaller than the second operation stopping power threshold.

In other words, the communication means 43 that consumes a larger amount of than the measuring means 20, starts operating after the measuring means 20, and the communication means 43 stops operating prior to the measuring means 20. Accordingly, the operation of the communication means 43 consuming a larger amount of power can be stabilized.

In the first embodiment, the control unit 42 sets, as the first extended power threshold, a threshold smaller than the second extended power threshold, and sets, as the first shortened power threshold, a threshold smaller than the second shortened power threshold.

In other words, the communication means 43 that consumes a larger amount of power than the measuring means 20, starts the shortened state after the measuring means 20, and the communication means 43 stops the shortened state prior to the measuring means 20. Accordingly, the operation of the communication means 43 consuming a larger amount of power can be stabilized.

[First Modification]

Hereinafter, a first modification of the first embodiment is explained. Mainly differences from the first embodiment are described below.

The first modification indicates an example of further providing a storage storage battery that stores power generated by photovoltaic cells.

Figure 5:
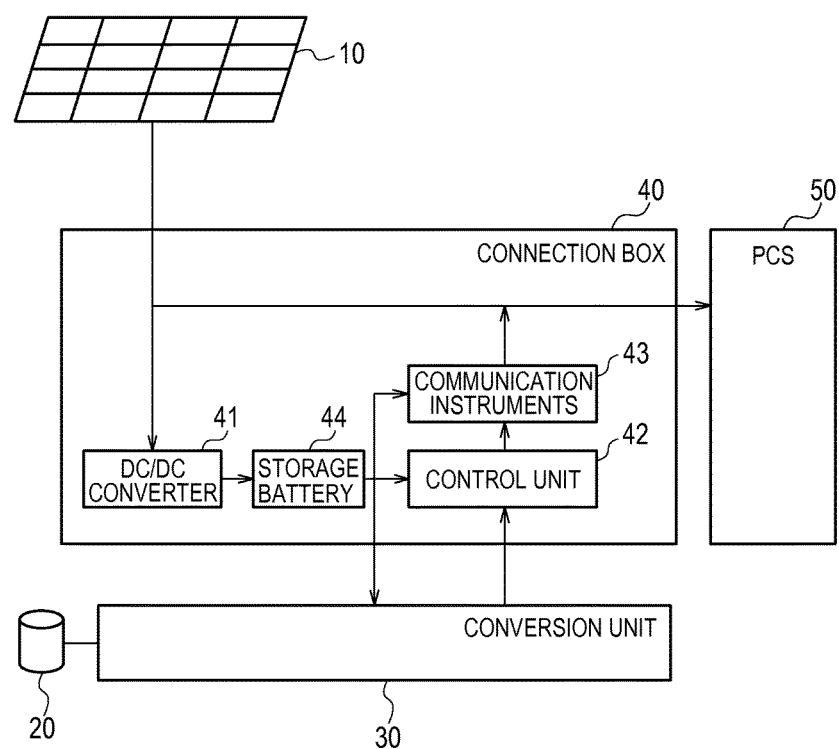
FIG. 5 is a diagram indicating a connection box 40 according to the first modification.

Specifically, as illustrated in FIG. 5, the connection box 40 has a storage battery 44, in addition to the configuration illustrated in FIG. 2. The storage battery 44 stores power generated by the photovoltaic cell 10.

(Example of Controlling Operation States)

Figure 6:
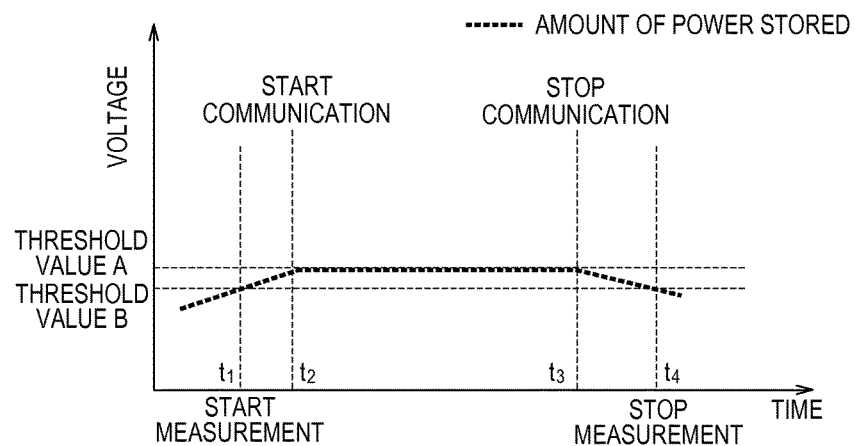
FIG. 6 is a diagram indicating an example of controlling the operation states according to the first modification.

Hereinafter, an example of controlling the operation states according to the first modification is explained. FIG. 6 is a diagram indicating an example of controlling the operation states according to the first modification.

Here, there indicated are the cases in which the operation states of the measuring means 20 include the ON state and the OFF state. Additionally, there indicated are the cases in which the operation states of the communication means 43 include the ON state and the OFF state. Additionally, a threshold A is the second operation starting power threshold and the second operation stopping power threshold, and a threshold B is the first operation starting power threshold and the first operation stopping power threshold.

In a case illustrated in FIG. 6, an amount of power stored in the storage battery 44 is used as the power supply.

As illustrated in FIG. 6, since the amount of power stored exceeds the threshold B at time $t_1$, the control unit 42 starts operating the measuring means 20. Since the amount of power stored exceeds the threshold A at time $t_2$, the control unit 42 starts operating the communication means 43. Since the amount of power stored falls below the threshold A at time $t_3$, the control unit 42 stops operating the communication means 43. Since the amount of power stored falls below the threshold B at time $t_4$, the control unit 42 stops operating the measuring means 20.

(Operation and Effect)

As described above, even when the amount of power stored in the storage battery 44 is used instead of the real-time amount of power generated by the photovoltaic cell 10, the same effects as in the first embodiment are obtained.

[Second Modification]

A description will be given below of a second modification of the first embodiment. Mainly, differences from the first modification are explained below.

In the first modification, an amount of power stored in the storage battery 44 is used as amount of power supplied. On the contrary, in the second modification, both of a real-time amount of power generated by the photovoltaic cell 10 and an amount of power stored in the storage battery 44 are used as the power supply.

(Example of Controlling Operation States)

Figure 7:
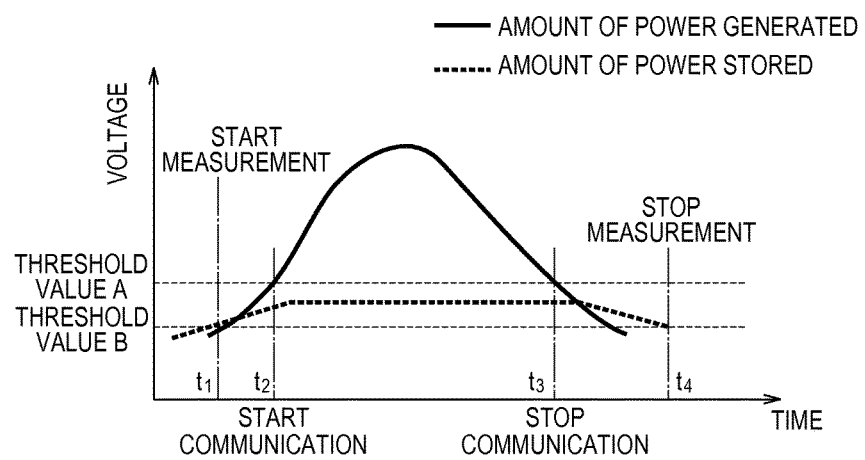
FIG. 7 is a diagram indicating an example of controlling the operation states according to the second modification.

Hereinafter, an example of controlling the operation states according to the second modification is explained. FIG. 7 is a diagram indicating an example of controlling the operation states according to the second modification.

Here, there indicated are the cases in which the operation states of the measuring means 20 include the ON state and the OFF state. Additionally, there indicated are the cases in which the operation states of the communication means 43 include the ON state and the OFF state. Additionally, a threshold A is the second operation starting power threshold and the second operation stopping power threshold, and a threshold B is the first operation starting power threshold and the first operation stopping power threshold.

In a case illustrated in FIG. 7, both of a real-time amount of power generated by the photovoltaic cell 10 and an amount of power stored in the storage battery 44 are used as the power supply. More particularly, the first power threshold is compared with the amount of power stored in the storage battery 44. On the contrary, the second power threshold is compared with the real-time amount of power generated by the photovoltaic cell 10.

As illustrated in FIG. 7, since the amount of power stored exceeds the threshold B at time $t_1$, the control unit 42 starts operating the measuring means 20. Since an amount of power generated exceeds the threshold A at time $t_2$, the control unit 42 starts operating the communication means 43. Since an amount of power generated falls below the threshold A at time $t_3$, the control unit 42 stops operating the communication means 43. Since the amount of power stored falls below the threshold B at time $t_4$, the control unit 42 stops operating the measuring means 20.

(Operation and Effect)

As described above, the same effects as in the first embodiment are provided even by using both of the real-time amount of power generated by the photovoltaic cell 10 and the amount of power stored in the storage battery 44.

In the second modification, the control unit 42 switches the operation states of the measuring means 20 on the basis of results comparing the first power threshold with the amount of power stored, and the control unit 42 switches the operation states of the communication means 43 on the basis of results comparing the second power threshold with the amount of power generated.

Accordingly, the operation states of the communication means 43 that consume a larger amount of power than the measuring means 20, are controlled on the basis of the real-time amount of power generated by the photovoltaic cell 10. Thus, the communication means 43 operates in a state where power is stable, so that the operation of the communication means 43 consuming a larger amount of power can be stabilized.

[Third Modification]

A description will be given below of a third modification of the first embodiment. Mainly differences from the first embodiment are described below.

The third modification indicates an example of further providing a memory that stores information measured by the measuring means.

Figure 8:
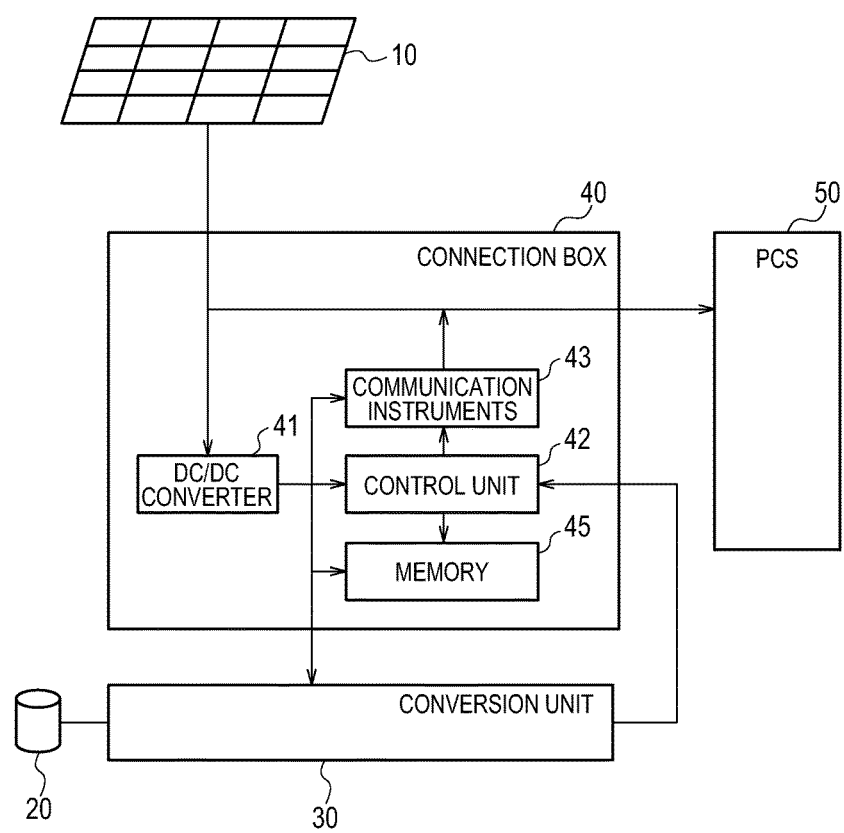
FIG. 8 is a diagram indicating a connection box 40 according to the third modification.

Specifically, as illustrated in FIG. 8, the connection box 40 has a memory 45, in addition to the configuration shown in FIG. 2. The memory 45 stores information measured by the measuring means 20.

For example, the memory 45 stores information measured by the measuring means 20 during a period (for example, nighttime) when the measuring means 20 operates and the communication means 43 does not operate, etc. Additionally, the communication means 43 transmits the information stored in the memory 45 to the measurement processor 80 when the communication means 43 operates.

Thus, it enables the transmission of information measured by the measuring means 20, to the measurement processor 80 during a period when the information cannot be transmitted to the measurement processor 80 in real-time.

[Fourth Modification]

A description will be given below of a fourth modification of the first embodiment. Mainly differences from the first embodiment are described below.

The fourth modification indicates an example of further providing an auxiliary photovoltaic cell available as a power source for the measuring means and the communication means.

Figure 9:
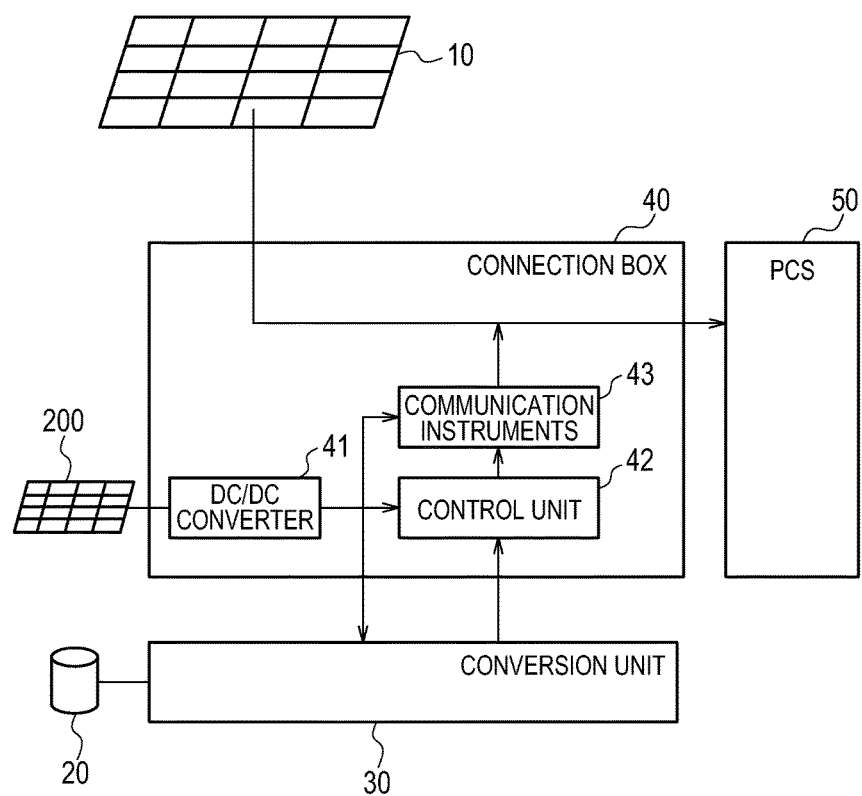
FIG. 9 is a diagram indicating a connection box 40 according to the third modification.

Specifically, as illustrated in FIG. 9, provided is an auxiliary photovoltaic cell 200 available as a power source for the measuring means 20 and the communication means 43. The auxiliary photovoltaic cell 200 is connected to the measuring means 20 and the communication means 43, and is not connected to the PCS 50. In other words, the auxiliary photovoltaic cell 200 may be used exclusively as a power source for the measuring means 20 and the communication means 43.

Additionally, the power generation capability of the auxiliary photovoltaic cell 200 may be lower than the power generation capability of the photovoltaic cell 10. That is, the auxiliary photovoltaic cell 200 may be smaller than the photovoltaic cell 10.

(Operation and Effect)

In the fourth modification, the auxiliary photovoltaic cell 200 is provided that is used exclusively as a power source for the measuring means 20 and the communication means 43. Accordingly, power may be stably supplied to the measuring means 20 and the communication means 43 without being dependent on the power amount to be supplied to the PCS 50.

[Fifth Modification]

Hereinafter, a fifth modification of the first embodiment is explained. Mainly differences from the first embodiment are described below.

In the fifth modification, the control unit 42 controls the communication means 43 so as to transmit information (first state flag, hereinafter) indicating the switch of operation states of the measuring means 20 to the measurement processor 80. Alternatively, the control unit 42 controls the communication means 43 so as to transmit information (second state flag, hereinafter) indicating the switch of operation states of the communication means 43 to the measurement processor 80.

For example, the first state flag is configured of one bit. In this case, when the measuring means 20 switches from the ON state to the OFF state, the first state flag that is set "0", is transmitted to the measurement processor 80. On the other hand, when the measuring means 20 switches from the OFF state to the ON state, the first state flag that is set "1", is transmitted to the measurement processor 80. Alternatively, when the measuring means 20 switches from the shortened state to the extended state, the first state flag that is set "0", is transmitted to the measurement processor 80. On the other hand, when the measuring means 20 switches from the extended state to the shortened state, the first state flag that is set "1", is transmitted to the measurement processor 80.

For example, the second state flag is configured of one bit. In this case, when the communication means 43 switches from the ON state to the OFF state, the second state flag that is set "0", is transmitted to the measurement processor 80. On the other hand, when the communication means 43 switches from OFF state to ON state, the second state flag that is set "1", is transmitted to the measurement processor 80. Alternatively, when the communication means 43 switches from the shortened state to the extended state, the second state flag that is set "0", is transmitted to the measurement processor 80. On the other hand, when the communication means 43 has switched from the extended state to the shortened state, the second state flag that is set "1", is transmitted to the measurement processor 80.

Additionally, the control unit 42 may control the communication means 43 so as to transmit only the first state flag. The control unit 42 may control the communication means 43 so as to transmit only the second state flag. The control unit 42 may control the communication means 43 so as to transmit both the first state flag and the second state flag.

Also, a timing at which the first state flag is transmitted may occur after a timing at which the state of the measuring means 20 is switched. Alternatively, a timing at which the first state flag is transmitted may occur before a timing at which the state of the measuring means 20 is switched.

Similarly, a timing at which the second state flag is transmitted may occur after a timing at which the state of the communication means 43 is switched. Alternatively, a timing at which the second state flag is transmitted may occur before a timing at which the state of the communication means 43 is switched.

However, in case of switching the communication means 43 from the ON state to the OFF state, it is preferable to transmit the second state flag before a timing at which the ON state is switched to the OFF state. Also, in case of switching the communication means 43 from the OFF state to the ON state, it is preferable to transmit the second state flag after a timing at which the OFF state is switched to the ON state.

(Operation and Effect)

In the fifth modification, the control unit 42 controls the communication means 43 so as to transmit information (first state flag) indicating the switch of operation states of the measuring means 20 to the measurement processor 80. Alternatively, the control unit 42 controls the communication means 43 so as to transmit information (second state flag) indicating the switch of operation states of the communication means 43 to the measurement processor 80.

Accordingly, it enables the measurement processor 80 to determine whether a trouble occurs in the measuring means 20 or the communication means 43 (connection box 40) placed outdoors. More particularly, when the measuring means 20 does not measure information at a scheduled time, it may be determined that the measuring means 20 has a problem. In addition, when information is not received at a scheduled time, it may be determined that the communication means 43 (connection box 40) has a problem. Alternatively, when information is not received at a scheduled time, it may be determined that a wired or wireless communication line, etc. has a problem.

Other Embodiments

The present invention has been described according to the embodiment. However, it must not be understood that the discussions and the drawings constituting a part of this disclosure limit the present invention. From this disclosure, various alternative embodiments, examples and operational techniques are apparent to those skilled in the art.

The embodiments indicated an example in which the connection box 40 accommodating a circuit cluster for communicating with the measurement processor 80 is only the connection box 40₁. However, the embodiments are not limited thereto. The connection box 40, other than the connection box 40₁, may accommodate a circuit cluster for communicating with the measurement processor 80.

Although it is not particularly mentioned in the embodiments, the total of a real-time amount of power generated by the photovoltaic cell 10 and an amount of power stored in the storage battery 44 may be used as the power supply.

Additionally, the above-mentioned embodiments explained the case in which power consumption is restricted by stopping the operation of the measuring means 20 and the communication means 43 or by extending a measurement cycle or a transmission cycle when the power supply falls below a predetermined threshold. However, by using a circuit disclosed in FIG. 3, the electric current to be supplied to the measuring means 20 and the communication means 43 may be reduced.

Note that the entire content of the Japanese Patent Application No. 2011-067987 (filed on Mar. 25, 2011) is incorporated herein by reference.

INDUSTRIAL APPLICABILITY

According to the present invention, when the power supplying means is used as a power source for the measuring means and the communication means, it is possible to appropriately control the operation of the measuring means and the communication means.

The invention claimed is:

1. A power management system comprising:
a power supplying unit;
a measuring unit configured to measure a power generation environment for the power supplying unit, wherein the power generation environment includes one or more measureable characteristics within an environment of the measuring unit;
a communication unit configured to transmit information measured by the measuring unit;
a memory configured to store information measured by the measuring unit during a period when the communication unit is out of operation; and
a control unit configured to control the measuring unit and the communication unit,
wherein
the power supplying unit is used as a power source for the measuring unit and the communication unit,
the control unit sets a first power threshold to be used for determining whether or not to switch operation states of the measuring unit, and a second power threshold, which is greater than the first power threshold, to be used for determining whether or not to switch operation states of the communication unit, on the basis of a power supply that is supplied from the power supplying unit,
the control unit switches operation states of the measuring unit on the basis of results comparing the power supply with the first power threshold, and switches operation states of the communication unit on the basis of results comparing the power supply with the second power threshold, and
the communication unit transmits the information stored in the memory when the communication unit is in operation.

2. The power management system according to claim 1, wherein a photovoltaic cell is provided as the power supplying unit.

3. The power management system according to claim 1, wherein
the first power threshold is a first operation starting power threshold to be used for determining whether or not to start operating the measuring unit and a first operation stopping power threshold to be used for determining whether or not to stop operating the measuring unit,
the second power threshold is a second operation starting power threshold to be used for determining whether or not to start operating the communication unit and a second operation stopping power threshold to be used for determining whether or not to stop operating the communication unit, and
the control unit
sets, as the first operation starting power threshold, a threshold smaller than the second operation starting power threshold, and
sets, as the first operation stopping power threshold, a threshold smaller than the second operation stopping power threshold.

4. The power management system according to claim 1, wherein the control unit uses a real-time amount of power generated by the power supplying unit, as the power supply.

5. The power management system according to claim 1, further comprising:

a storage battery that stores power generated by the power supplying unit,
wherein the control unit uses an amount of power stored in the storage battery as the power supply.

6. The power management system according to claim 1, further comprising:
a storage battery that stores power generated by the power supplying unit,
wherein the control unit uses a real-time amount of power generated by the power supplying unit and the amount of power stored in the storage battery, as the power supply.

7. The power management system according to claim 1, wherein
the first power threshold is a first extended power threshold to be used for determining whether or not to extend a measurement cycle of the measuring unit and a first shortened power threshold to be used for determining whether or not to shorten a measurement cycle of the measuring unit,
the second power threshold is a second extended power threshold to be used for determining whether or not to extend a transmission cycle of the communication unit and a second shortened power threshold to be used for determining whether or not to shorten the transmission cycle of the communication unit, and
the control unit
sets, as the first extended power threshold, a threshold smaller than the second extended power threshold, and
sets, as the first shortened power threshold, a threshold smaller than the second shortened power threshold.

8. The power management system according to claim 1, wherein the control unit supplies electric current that is smaller than a predetermined threshold, to the measuring unit during a period when the measuring unit is out of operation.

9. The power management system according to claim 6, wherein the control unit supplies electric current that is smaller than a predetermined threshold, to the measuring unit during a period when the measuring unit is out of operation.

10. The power management system according to claim 1, further comprising:
an auxiliary photovoltaic cell available as a power source for the measuring unit and the communication unit,
wherein the control unit uses a power supply that is supplied from the auxiliary photovoltaic cell as the power supply.

11. The power management system according to claim 2, further comprising:
an auxiliary photovoltaic cell available as a power source for the measuring unit and the communication unit,
wherein the control unit uses a power supply that is supplied from the auxiliary photovoltaic cell as the power supply.

12. A power management method used in the power management system comprising a power supplying unit, a measuring unit configured to measure a power generation environment for the power supplying unit, a communication unit configured to transmit information measured by the measuring unit, and a memory configured to store information measured by the measuring unit during a period when the communication unit is out of operation, wherein the power supplying unit is used as a power source for the measuring unit and the communication unit, and wherein the power generation environment includes one or more measurable characteristics within an environment of the measuring unit, the power management method comprising steps of:
setting a first power threshold to be used for determining whether or not to switch operation states of the measuring unit, and a second power threshold, which is greater than the first power threshold, to be used for determining whether or not to switch operation states of the communication unit on the basis of a power supply that is supplied from the power supplying unit;
switching operation states of the measuring unit on the basis of results comparing the power supply with the first power threshold, and switching operation states of the communication unit on the basis of results comparing the power supply with the second power threshold; and
transmitting the information stored in the memory from the communication unit when the communication unit is in operation.

13. The power management method according to claim 12, wherein a photovoltaic cell is provided as the power supplying unit.

14. The power management method according to claim 12, wherein the first power threshold is a first operation starting power threshold to be used for determining whether or not to start operating the measuring unit and a first operation stopping power threshold to be used for determining whether or not to stop operating the measuring unit, the second power threshold is a second operation starting power threshold to be used for determining whether or not to start operating the communication unit and a second operation stopping power threshold to be used for determining whether or not to stop operating the communication unit, the power management method comprising steps of:
setting, as the first operation starting power threshold, a threshold smaller than the second operation starting power threshold, and
setting, as the first operation stopping power threshold, a threshold smaller than the second operation stopping power threshold.

15. The power management method according to claim 12, wherein a storage battery that stores power generated by the power supplying unit is provided, the power management method comprising a step of:
using the amount of power stored in the storage battery, as the power supply.

16. The power management method according to claim 12, wherein the storage battery that stores power generated by the power supplying unit is provided, the power management method comprising a step of:
using a real-time amount of power generated by the power supplying unit and the amount of power stored in the storage battery, as the power supply.

17. The power management method according to claim 12, wherein the first power threshold is a first extended power threshold to be used for determining whether or not to extend a measurement cycle of the measuring unit and a first shortened power threshold to be used for determining whether or not to shorten a measurement cycle of the measuring unit, the second power threshold is a second extended power threshold to be used for determining whether or not to extend a transmission cycle of the communication unit and a second shortened power threshold to be used for determining whether or not to shorten the transmission cycle of the communication unit, the power management method comprising steps of:

setting, as the first extended power threshold, a threshold smaller than the second extended power threshold, and
setting, as the first shortened power threshold, a threshold smaller than the second shortened power threshold.

18. The power management system according to claim 1, wherein the one or more measurable characteristics comprise one or more of an amount of solar radiation on the power supplying unit, an air temperature around the power supplying unit, and a temperature of the power supplying unit.

19. The power management method according to claim 12, wherein the one or more measurable characteristics comprise one or more of an amount of solar radiation on the power supplying unit, an air temperature around the power supplying unit, and a temperature of the power supplying unit.

* * * * *